United States Patent
Fodor et al.

(10) Patent No.: US 11,736,184 B2
(45) Date of Patent: Aug. 22, 2023

(54) CELLULAR SERVICE IMPROVEMENT AND EXTENSION BY USER EQUIPMENT

(71) Applicant: Telefonaktiebolaget LM Ericsson (publ), Stockholm (SE)

(72) Inventors: Gabor Fodor, Hässelby (SE); Fredrik Gunnarsson, Linköping (SE); Jonas Kronander, Knivsta (SE); Bengt Lindoff, Bjärred (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 979 days.

(21) Appl. No.: 15/522,381

(22) PCT Filed: Aug. 30, 2016

(86) PCT No.: PCT/SE2016/050812
§ 371 (c)(1),
(2) Date: Apr. 27, 2017

(87) PCT Pub. No.: WO2018/044212
PCT Pub. Date: Mar. 8, 2018

(65) Prior Publication Data
US 2018/0294864 A1 Oct. 11, 2018

(51) Int. Cl.
*H04B 7/155* (2006.01)
*H04W 16/26* (2009.01)
(Continued)

(52) U.S. Cl.
CPC ........ *H04B 7/15507* (2013.01); *H04W 16/26* (2013.01); *H04W 24/02* (2013.01);
(Continued)

(58) Field of Classification Search
CPC ...... H04W 84/18; H04W 84/20; H04W 88/04
See application file for complete search history.

(56) References Cited

U.S. PATENT DOCUMENTS 6,047,178 A * 4/2000 Frlan .................. H04W 88/085
455/423
6,415,146 B1 * 7/2002 Capece ................ H04W 88/08
455/517

(Continued)

OTHER PUBLICATIONS

Unknown, Author, "Discussion on relay initiation and discovery", 3GPP TSG RAN WG2 #91, R2-153765, Beijing, China, Aug. 24-28, 2015, 1-5.

(Continued)

*Primary Examiner* — Liton Miah
(74) *Attorney, Agent, or Firm* — Sage Patent Group

(57) ABSTRACT

A method, wireless device, and network node configured to enable a wireless device to serve as a base station to at least one other wireless device in a communications network, the wireless device being configured to perform predetermined base station functions. The method includes determining a condition triggering a need to provide the predetermined base station functions to the at least one other wireless device, notifying a network node in the communications network that the wireless device is available to provide the predetermined base station functions, receiving approval from the network node to provide the predetermined base station functions, and providing the predetermined base station functions to the at least one other wireless device.

20 Claims, 9 Drawing Sheets

(51) Int. Cl.
*H04W 24/02* (2009.01)
*H04W 24/08* (2009.01)
*H04W 76/10* (2018.01)
*H04W 76/14* (2018.01)
*H04W 88/04* (2009.01)

(52) U.S. Cl.
CPC .......... *H04W 24/08* (2013.01); *H04W 76/10* (2018.02); *H04W 76/14* (2018.02); *H04W 88/04* (2013.01)

(56) References Cited

U.S. PATENT DOCUMENTS

| | | | | |
|---|---|---|---|---|
| 2002/0058480 A1* | 5/2002 | Ikeda | .................... | H04L 47/193 |
| | | | | 455/67.11 |
| 2003/0203716 A1* | 10/2003 | Takahashi | .............. | H04B 7/155 |
| | | | | 455/11.1 |
| 2012/0087396 A1* | 4/2012 | Nimbalker | ............ | H04L 1/1822 |
| | | | | 375/219 |
| 2012/0315841 A1* | 12/2012 | Zhou | .................... | H04B 7/2606 |
| | | | | 455/11.1 |
| 2013/0343261 A1* | 12/2013 | Gonsa | .................... | H04L 5/001 |
| | | | | 370/315 |
| 2014/0056124 A1* | 2/2014 | Yeow | .................. | H04W 40/246 |
| | | | | 370/221 |
| 2014/0213244 A1* | 7/2014 | Oh | ........................ | H04W 88/04 |
| | | | | 455/419 |
| 2014/0254373 A1* | 9/2014 | Varma | ................... | H04W 40/36 |
| | | | | 370/235 |
| 2015/0109910 A1* | 4/2015 | Hurd | ..................... | H04L 1/1887 |
| | | | | 370/252 |
| 2015/0382159 A1* | 12/2015 | Kim | ........................ | H04W 4/08 |
| | | | | 370/312 |
| 2016/0262142 A1* | 9/2016 | Nagata | .................. | H04W 8/005 |
| 2016/0302181 A1* | 10/2016 | Fujishiro | .............. | H04W 76/23 |
| 2017/0026937 A1* | 1/2017 | Jung | ..................... | H04W 72/02 |
| 2017/0093541 A1* | 3/2017 | Pan | ....................... | H04L 5/0048 |
| 2017/0244469 A1* | 8/2017 | Seo | ........................ | H04W 68/02 |
| 2017/0324608 A1* | 11/2017 | Ohta | ..................... | H04W 12/06 |
| 2017/0359766 A1* | 12/2017 | Agiwal | ................. | H04W 76/14 |
| 2018/0014262 A1* | 1/2018 | Lee | ..................... | H04W 52/346 |
| 2018/0069618 A1* | 3/2018 | Loehr | ................ | H04B 7/15542 |
| 2018/0076877 A1* | 3/2018 | Liu | .................... | H04B 7/15507 |

OTHER PUBLICATIONS

Unknown, Author, "Discussions on L3-based UE-to-Network Relays communication procedure", 3GPP TSG RAN WG2 Meeting #91, R1-153488, Beijing, China, Aug. 24-28, 2015, 1-8.

Unknown, Author, "Relay selection criteria for public safety discovery", 3GPP TSG-RAN WG2 #91 bis, R2-154160, Malmo, Sweden, Oct. 5-9, 2015, 1-5.

* cited by examiner

CELLULAR SERVICE IMPROVEMENT AND EXTENSION BY USER EQUIPMENT

TECHNICAL FIELD

The present disclosure relates to wireless communication and in particular to extending the coverage and quality of cellular services available to surrounding wireless devices in a communications network by selecting a particular wireless device to serve as a base station and perform preselected base station functions for the other wireless devices.

BACKGROUND

Modern radio access networks (RAN) are designed to provide high hit rate mobile access to a variety of core networks (CNs), including public switched telephone networks (PSTNs), packet switched data networks (PDNs) and enterprise networks based on the Internet Protocol (IP) suite. The interface between the RAN and the CN is typically designed and standardized in a way that facilitates the provisioning of high quality end-to-end services to a large variety of wireless devices belonging to different categories characterized by a wide range of UE capabilities. Such UE capabilities include the supported peak data rate, UE size, cost, battery life, multi-antenna and radio frequency (RF) capabilities, etc. In 3GPP Long Term Evolution (LIE) Release 8 and Release 9 systems, for example, Category 5 UEs support up to 300 Mbps in the downlink (DL) and 75 Mbps in the uplink (UL), whereas Category 1 UEs need to support only 10 Mbps in the DL and 5 Mbps in the UL. The DL represents a telecommunications link for signals sent from a network node such as a base station to a wireless device. The UL represents a telecommunications link for signals sent from the wireless device to a network node such as a base station.

Likewise, the capabilities of the deployed RAN infrastructure, including the capabilities of the base stations (BS) and the interconnecting (backhaul) network are different in terms of the supported bitrates, coverage area, inter-BS communication capabilities and the technology options that can be used to connect the RAN to the CN nodes. In LTE systems, the interface between the RAN and the CN, referred to as the S1 interface, can be implemented by a variety of Open Systems Interconnect (OSI) Layer 2 and Layer 3 technologies, including fixed Ethernet and IP based networks, fiber optical wavelength division multiplexing networks and/or, micro- or mmWave radio links.

Referring to FIG. 1, a typical architecture of a cellular network 10 is shown. The network 10 includes RAN 12 and CN 14. RAN 12 includes RAN nodes 16a-16f (referred to collectively herein as "16") such as, for example, base stations, e.g., eNodeBs (eNBs), and associated RAN infrastructure, such as wireless devices 17a-17g (referred to collectively herein as "17") in communication with a respective RAN node 16. CN 14 is implemented over a backhaul network 18. In one embodiment, the backhaul network 18 is a TCP/IP based network. CN 14 may include, for example, a serving gateway (SGW) 19 and a mobile management entity (MME) 20. In LTE environments, the interface between the RAN 12 and the CN 14 is called the S1 interface that can be implemented by the RAN nodes 16 and edge routers (ER) 22 of the backhaul network 18. The technologies that can be used to realize the S1 interface include fixed (e.g., wired, optical, etc.) or wireless technologies. It should be noted that the present disclosure is not limited to the implementation of methods over an S1 interface and the methods described herein may be implemented over other interface types.

In disaster situations caused by, for example, earthquakes, hurricanes or tsunami, there is a need to maintain at least local communication services to allow the discovery of victims and allow rudimentary communication services between rescue personnel. To meet such requirements, the 3GPP has defined technology components that can be used to maintain local communications when parts of the whole of RAN 12 is affected by Public Protection and Disaster relief (PDDR) and National Strategic Protective System (NSPS) situations. For example, parts or the whole of the coverage of RAN 12 can become dysfunctional, or the S1 interface can become unavailable even if the RAN nodes 16 remain intact. For example, in FIG. 1, some of the RAN nodes 16, i.e., radio base stations (BSs) can be damaged or some of the BSs cannot connect to the ERs 22 of the CN 14 leading to the loss of end-to-end services.

FIG. 2 is a representation of a scenario where some of the served wireless devices lose service (i.e., are no longer within the coverage area of cellular services, i.e., a serving base station) due to one or more RAN nodes 16 becoming dysfunctional or due to loss or degradation of the S1 interface between the RAN and CN. Existing technologies do not provide an efficient solution to provide end-to-end communication services in situations in which parts or the whole of the RAN or the S1 interface are damaged or partially dysfunctional. As illustrated in FIG. 2, some of the RAN nodes 16 (e.g., BSs) and the communication link over the S1 interface are affected in, for example a PPDR or NSPS scenario. In such a case, existing technologies can provide local communication services between devices in the close proximity of each other, but end-to-end services cannot be maintained.

Another problem with existing technologies arises when a large number of wireless devices 17 requests service simultaneously. In such situations, a RAN node 16, such as a BS, may not be able to provide sufficient bitrates to all or the majority of the wireless devices 17 requesting high quality end-to-end services. The bottleneck in such a scenario may be, for example, the radio interface between the user interface and the radio access point (i.e., BS) or the interface between the RAN and the CN, the processing capability of the BS and/or CN node or the combinations thereof. Existing technologies, in such situations limit the number of simultaneously served wireless devices or limit the service provided to the served wireless devices or employ some combination of such techniques.

SUMMARY

The present disclosure advantageously provides a method, a wireless device, and a network node for extending the coverage and quality of cellular services available to surrounding wireless devices in a communications network by selecting a particular wireless device to serve as a base station and perform preselected base station functions for the other wireless devices.

According to one aspect of the disclosure, a method for enabling a wireless device to serve as a base station to at least one other wireless device in a communications network where the wireless device is configured to perform predetermined base station functions, is provided. In one embodiment, the method includes determining a condition triggering a need to provide the predetermined base station functions to the at least one other wireless device, notifying a network node in the communications network that the wireless device is available to provide the predetermined base station functions, receiving approval from the network node to provide the predetermined base station functions, and providing the predetermined base station functions to the at least one other wireless device.

According to one embodiment of this aspect, determining the condition triggering the need to provide the predetermined base station functions to the at least one other wireless device includes performing measurements to determine a quality of cellular coverage. According to another embodiment of this aspect, the measurements include at least one of reference signal received power (RSRP), reference signal received quality (RSRQ), end-to-end hit rates, packet error probability, and latency.

According to another embodiment of this aspect, the predetermined base station functions performed by the wireless device include emulating a base station uplink (UL) and a base station downlink (DL) to support the at least one other wireless device such that base station UL and base station DL protocols used with respect to the at least one other wireless device are maintained. According to another embodiment of this aspect, the predetermined base station functions performed by the wireless device include establishing sidelinks to support the at least one other wireless device using sidelink protocols to maintain connectivity. According to another embodiment of this aspect, the network node is an edge router and wherein providing the predetermined base station functions to the at least one other wireless device in the communication network comprises emulating an S1 interface with the edge router.

According to another embodiment of this aspect, receiving approval from the network node to provide the predetermined base station functions further includes receiving configuration parameters from the network node, the configuration parameters concerning operation of the wireless device when it performs the predetermined base station functions. According to another embodiment of this aspect, the configuration parameters include at least one of a carrier frequency, an operational bandwidth for DL and, UL operation, a new cell identity (Cell ID) for the wireless device, a neighbor cell list, a maximum allowed transmit power, and S1 interface parameters.

According to another embodiment of this aspect, determining the condition triggering the need to provide the predetermined base station functions to the at least one other wireless device includes detecting a loss of cellular coverage between the wireless device and a base station serving the wireless device. According to another embodiment of this aspect, determining the condition triggering the need to provide predetermined base station functions to the at least one other wireless device includes receiving a signal from the network node indicating that an S1 interface between a base station serving the wireless device and a radio access network (RAN) has become impaired. According to another embodiment of this aspect, the method further includes sending an acknowledgement to the network node, the acknowledgment indicating that the wireless device will provide the predetermined base station functions to the at least one other wireless device. According to another embodiment of this aspect, the network node is a base station and wherein determining the condition triggering the need to provide the predetermined base station functions to the at least one other wireless device is performed by the base station based upon detection of a predetermined load on the base station.

According to another aspect of this disclosure, a wireless device configured to serve as a base station to at least one other wireless device in a communications network, the wireless device being configured to perform predetermined base station functions, is provided. According to an embodiment of this aspect, the wireless device includes processing circuitry including a memory and a processor, the memory in communication with the processor, the memory having instructions that, when executed by the processor, configure the processor to determine a condition triggering a need to provide the predetermined base station functions to the at least one other wireless device. The wireless device also includes a communications interface configured to notify a network node in the communications network that the wireless device is available to provide the predetermined base station functions and receive approval from the network node to provide the predetermined base station functions. The processor is further configured to provide the predetermined base station functions to the at least one other wireless device in the communication network.

According to another embodiment of this aspect, determining the condition triggering the need to provide the predetermined base station functions to the at least one other wireless device includes performing measurements to determine a quality of the cellular coverage. According to another embodiment of this aspect, the measurements include at least one of reference signal received power (RSRP), reference signal received quality (RSRQ), end-to-end bit rates, packet error probability, and latency. According to another embodiment of this aspect, the predetermined base station functions performed by the wireless device include emulating a base station uplink (UL) and a base station downlink (DL) to support the at least one other wireless device such that base station UL and base station DL protocols used with respect to the at least one other wireless device are maintained.

According to another embodiment of this aspect, the predetermined base station functions performed by the wireless device include establishing sidelinks to support the at least one other wireless device using sidelink protocols to maintain connectivity. According to another embodiment of this aspect, the network node is an edge router and wherein providing the predetermined base station functions to the at least one other wireless device in the communication network includes emulating an S1 interface towards the edge router.

According to another embodiment of this aspect, receiving approval from the network node to provide the predetermined base station functions further includes receiving, by the communications interface, configuration parameters from the network node, the configuration parameters concerning operation of the wireless device when it performs the predetermined base station functions. According to another embodiment of this aspect, the configuration parameters include at least one of a carrier frequency, an operational bandwidth for DL and UL operation, a new cell identity (Cell ID), for the wireless device, a neighbor cell list, a maximum allowed transmit power, and S1 interface parameters.

According to another embodiment of this aspect, determining the condition triggering the need to provide the predetermined base station functions to the at least one other wireless device includes detecting a loss of cellular coverage between the wireless device and a base station serving the wireless device. According to another embodiment of this aspect, determining the condition triggering the need to provide the predetermined base station functions to the at least one other wireless device includes receiving, by the communication interface, a signal from the network node indicating that an S1 interface between a base station serving the wireless device and a radio access network (RAN) has become impaired. According to another embodiment of this aspect, the communications interface is further configured to send an acknowledgement to the network node, the acknowledgment indicating that the wireless device will provide the predetermined base station functions to the at least one other wireless device. According to another embodiment of this aspect, the network node is a base station and wherein determining the condition triggering the need to provide the predetermined base station functions to the at least one other wireless device is performed by the base station based upon detection of a predetermined load at the base station.

According to another aspect of this disclosure, a method for enabling a wireless device of a plurality of wireless devices in a communications network to provide predetermined base station functions to at least one other wireless device of the plurality of wireless devices, the wireless device being configured to perform the predetermined base station functions, is provided. According to an embodiment of this aspect, the method includes receiving, from at least one candidate wireless device, a notification that the at least one candidate wireless device is available to provide the predetermined base station functions, evaluating the at least one candidate wireless device, based at least upon on the evaluating of the at least one candidate. wireless device, approving at least one of the at least one candidate wireless device to provide the predetermined base station functions to the at least one other wireless device in the communications network.

According to another embodiment of this aspect, the predetermined base station functions performed by the approved at least one of the at least one candidate wireless device include emulating a base station uplink (UL) and a base station downlinks (DL) to support the at least one other wireless device such that base station UL and base station DL protocols used with respect to the at least one other wireless devices are maintained. According to another embodiment of this aspect, the predetermined base station functions performed by the approved at least one of the at least one candidate wireless device include establishing sidelinks to support the at least one other wireless device using sidelink protocols to maintain connectivity. According to another embodiment of this aspect, providing the predetermined base station functions to the at least one other wireless device in the communications network includes emulating an S1 interface towards an edge router.

According to another embodiment of this aspect, evaluating the at least one candidate wireless device includes considering at least one of signal strength and category of the at least one or more candidate wireless device. According to another embodiment of this aspect, the method further includes transmitting to the approved at least one of the at least one candidate wireless device configuration parameters concerning operation of the approved at least one of the at least one candidate wireless device when it performs the predetermined base station functions. According to another embodiment of this aspect, the configuration parameters include at least one of a carrier frequency, an operational bandwidth for DL and, UL operation, a new cell identity (Cell ID) for the approved at least one of the at least one candidate wireless device, a neighbor cell list, a maximum allowed transmit power, and S1 interface parameters.

According to another embodiment of this aspect, the method further includes receiving an acknowledgement from the approved at least one of the at least one candidate wireless device, the acknowledgment indicating that the approved at least one of the at least one candidate wireless device will provide the predetermined base station functions to the at least one other wireless device. According to another embodiment of this aspect, upon receipt of the acknowledgement, the method further includes broadcasting a presence of the approved at least one of the at least one candidate wireless device to other network nodes in the communication network.

According to another embodiment of this aspect, the method further includes broadcasting network node capability information to the plurality of wireless devices in the communication network. According to another embodiment of this aspect, the network node capability information includes at least one of supported frequency hands, supported interfaces, communication protocols, a maximum number of simultaneously supported network nodes, and quality of service (QoS) parameters. According to another embodiment of this aspect, the method further includes receiving from a base station in the communications network, identification parameters related to the approved at least one of the at least one candidate wireless device.

According to another aspect of this disclosure, a network node for enabling a wireless device of a plurality of wireless devices to provide predetermined base station functions to at least one other wireless device of the plurality of wireless devices in a communications network, the wireless device being configured to perform the predetermined base station functions, is provided. In one embodiment of this aspect, the network node includes a communications interface configured to receive, from at least one candidate wireless device, a notification that the at least one candidate wireless device is available to provide the predetermined base station functions. The network node also includes processing circuitry including a memory and a processor, the memory in communication with the processor, the memory having instructions that, when executed by the processor, configure the processor to evaluate the at least one candidate wireless device. Based at least upon the evaluating of the at least one candidate wireless device, the network node is configured to approve at least one of the at least one candidate wireless device to provide the predetermined base station functions to the at least one other wireless device in the communications network.

According to another embodiment of this aspect, the predetermined base station functions performed by the approved at least one of the at least one candidate wireless device include emulating a base station UL and a base station DL to support the at least one other wireless device such that base station UL and base station DL protocols used with respect to the at least one other wireless device are maintained. According to another embodiment of this aspect, the predetermined base station functions performed by the approved at least one of the at least one candidate wireless device include establishing sidelinks to support the at least one other wireless device using sidelink protocols to maintain connectivity.

According to another embodiment of this aspect, providing the predetermined base station functions to the at least one other wireless device in the communication network emulates an S1 interface towards an edge router. According to another embodiment of this aspect, evaluating the at least one candidate wireless device includes considering at least one of signal strength and category of the at least one or more candidate wireless device. According to another embodiment of this aspect, the communications interface is further configured to transmit to the approved at least one of the at least one candidate wireless device configuration parameters concerning operation of the approved at least one of the at least one candidate wireless device when it performs the predetermined base station functions.

According to another embodiment of this aspect, the configuration parameters include at least one of a carrier frequency, an operational bandwidth for DL and UL operation, a new cell identity (Cell ID) for the approved at least one of the at least one candidate wireless device, a neighbor cell list, a maximum allowed transmit power, and S1 interface parameters. According to another embodiment of this aspect, the communications interface is further configured to receive an acknowledgement from the approved at least one of the at least one candidate wireless device, the acknowledgment indicating that the approved at least one of the at least one candidate wireless device will provide the predetermined base station functions to the at least one other wireless device.

According to another embodiment of this aspect, upon receipt of the acknowledgement, the communications interface is further configured to broadcast a presence of the approved at least one of the at least one candidate wireless device to other network nodes in the communication network. According to another embodiment of this aspect, the communications interface is further configured to broadcast network node capability information to the plurality of wireless devices in the communication network. According to another embodiment of this aspect, the network node capability information includes at least one of supported frequency bands, supported interfaces, communication protocols, a maximum number of simultaneously supported network nodes, and quality of service (QoS) parameters.

According to another embodiment of this aspect, the processor is further configured to receive from a base station in the communications network identification parameters related to the approved at least one of the at least one candidate wireless device.

According to another aspect of this disclosure, a wireless device configured to serve as a base station to at least other wireless device in a communications network, the wireless device being configured to perform predetermined base station functions, is provided. In one embodiment of this aspect, the wireless device includes a base station function determination module configured to determine a condition triggering a need to provide the predetermined base station functions to the at least one other wireless device, and a communications interface module configured to notify a network node in the communications network that the wireless device is available to provide the predetermined base station functions and receive approval from the network node to provide the predetermined base station functions. The base station function determination module is further configured to provide the predetermined base station functions to the at least one other wireless device in the communication network.

According to another aspect of this disclosure, a network node for enabling a wireless device of a plurality of wireless devices to provide predetermined base station functions to at least one other wireless device of the plurality of wireless devices in a communications network, the wireless device being configured to perform the predetermined base station functions, is provided. In one embodiment of this aspect, the network node includes a communications interface module configured to receive, from at least one candidate wireless device, a notification that the at least one candidate wireless device is available to provide the predetermined base station functions, and a candidate wireless device evaluation module configured to evaluate the at least one candidate wireless device. Based at least upon the evaluating of the at least one candidate wireless device, the network node is configured to approve at least one of the at least one candidate wireless device to provide the predetermined base station functions to the at least one other wireless device in the communications network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
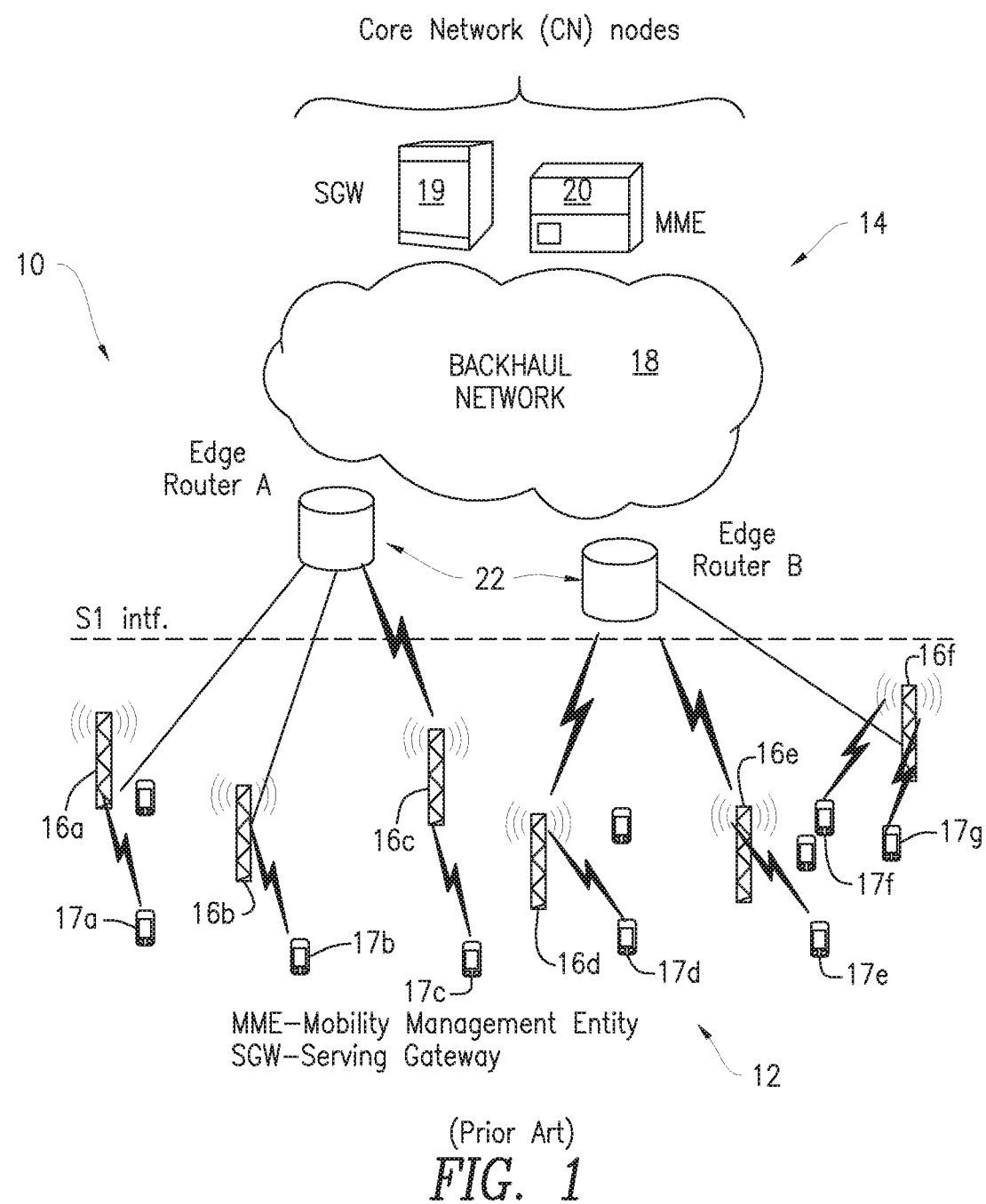
FIG. 1 is a block diagram of a typical cellular network illustrating core network nodes, IP backbone, edge routers, base stations and wireless devices.
Figure 2:
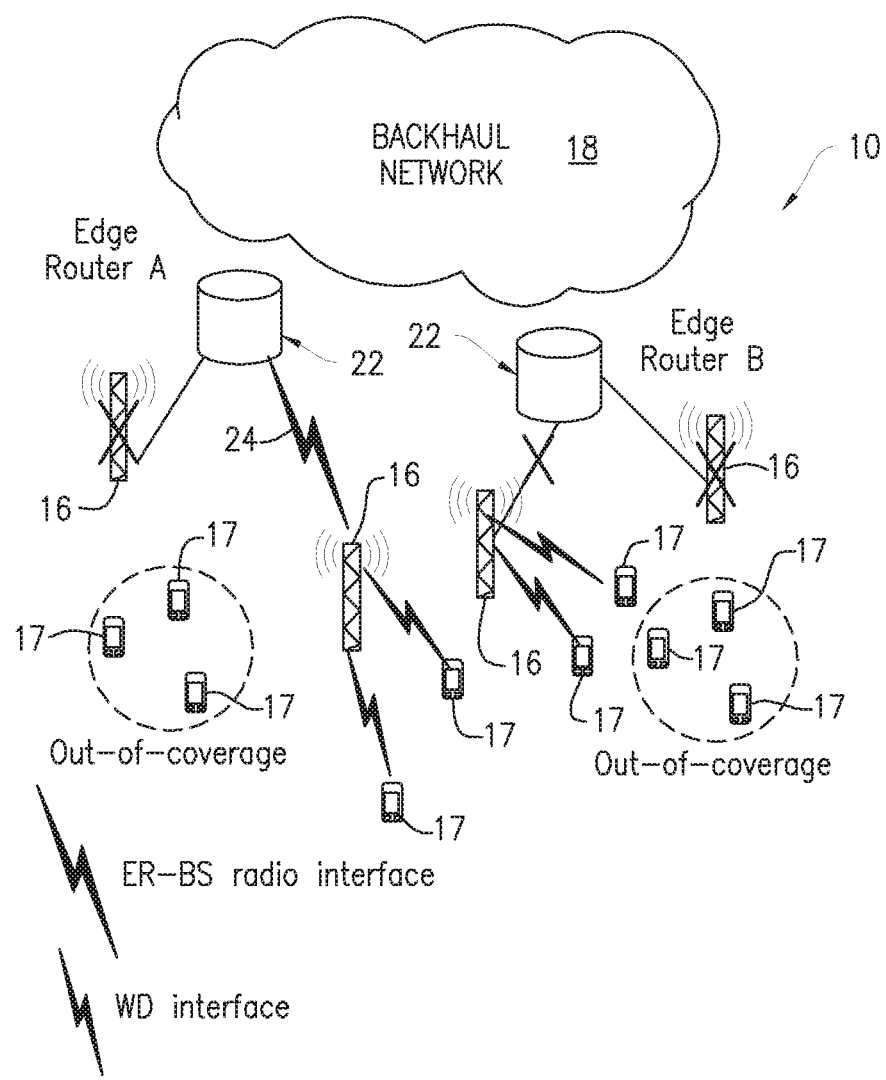
FIG. 2 is a block diagram of a typical cellular network illustrating wireless devices losing service due to RAN nodes becoming dysfunctional or due to damage to S1 connectivity.

Before describing in detail exemplary embodiments, it is noted that the embodiments reside primarily in combinations of apparatus components and processing steps related to extending the coverage and quality of cellular services available to surrounding wireless devices in a communications network by selecting a particular wireless device to serve as a base station and perform preselected base station functions for the other wireless devices. By enhancing the capabilities of certain wireless devices in order to allow select wireless devices to perform preselected base station functions, the method and arrangements disclosed herein advantageously provide connectivity in order to maintain end-to-end services to wireless devices that may move outside the coverage of the regularly deployed base stations. This can be due to, for example, disaster or other situations leading to the damage or dysfunction of RAN equipment. Further, the methods and arrangements disclosed herein can advantageously enhance the capacity of the regularly deployed RAN without requiring costly infrastructure deployments or upgrades depending on the fluctuations of the load in terms of number of users and requested bit rates. Thus, an advantage of the methods and arrangements disclosed herein is the enhancement of cellular services in terms of basic core network connectivity and/or capacity without the deployment or upgrading of the cellular infrastructure.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In addition, the terms "class" and "category" are used interchangeably herein as well as the terms "classifying" and "categorizing."

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 3:
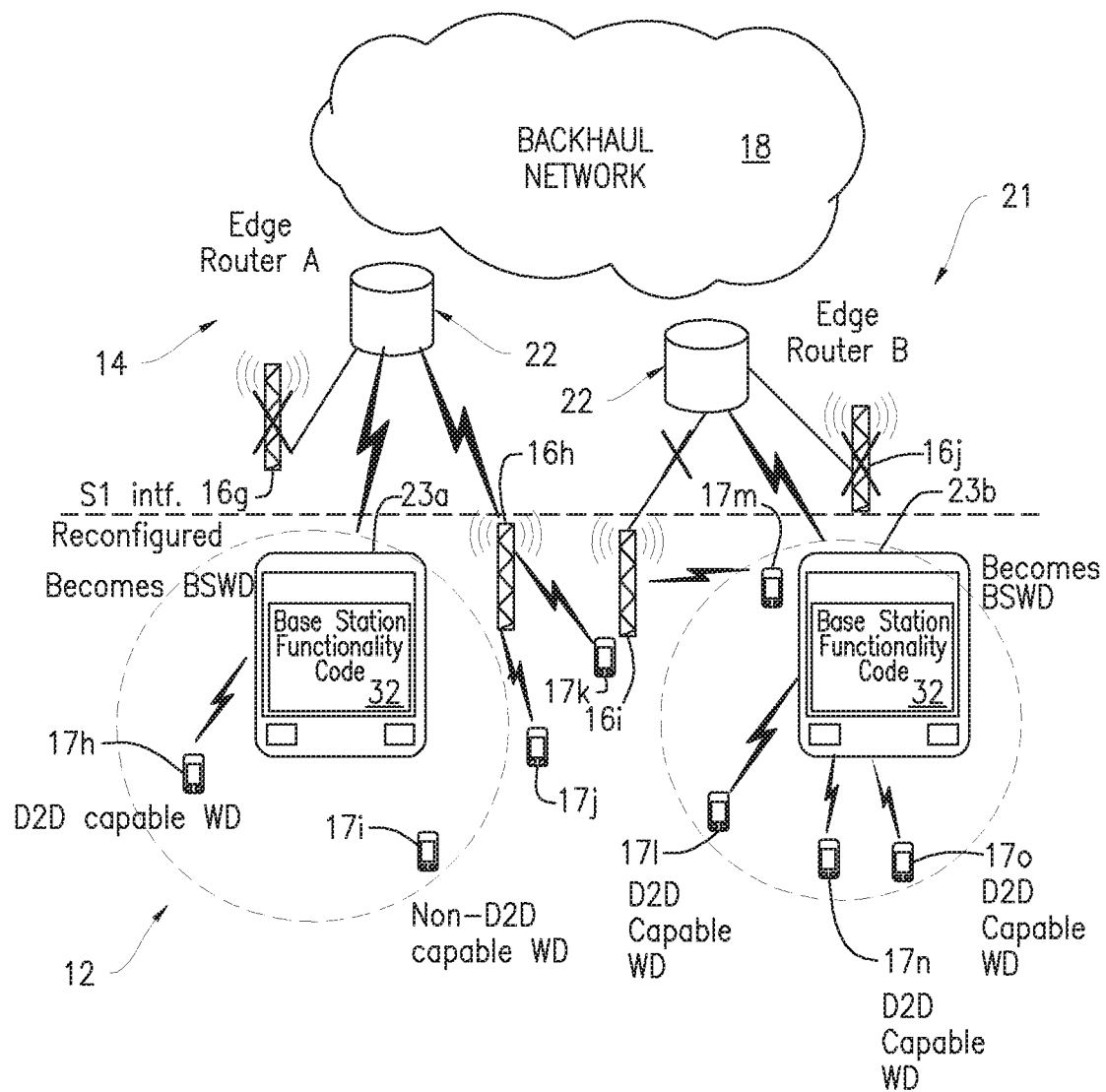
FIG. 3 is a block diagram of a cellular network where select wireless devices provide base station functions to other wireless devices in the network according to the principles of the present disclosure.

Referring now to drawing figures in which like reference designators refer to like elements there is shown in FIG. 3 a block diagram of an exemplary system for extending the coverage and quality of cellular services available to surrounding wireless devices in communications network 21 by selecting a particular wireless device to serve as a base station and configuring the selected wireless device to perform preselected base station functions for the other wireless devices in communications network 21.

Network 21 may be any wireless communication network including, for example, an LTE RAN. It will be understood, however, that the present disclosure is not limited to such embodiments and may be embodied generally in any type of wireless communication network according to one or more radio access technologies. Network 21 includes backhaul network 18 and one or more edge routers 22, which are part of CN 14. Backhaul network 18 is a link between CN 14 and edge routers 22. Note that in some embodiments, backhaul network 18 uses the Transmission Control Protocol (TCP)/internet Protocol (IP) protocol for communication between elements of network 21. Network 21 also includes one or more RAN nodes 16g-16j of RAN 12, each of which are in communication with one of Edge Router A and Edge router B of CN 14. For simplicity, only four RAN nodes 16g-16j are shown in FIG. 3, it being understood that more or fewer than four RAN nodes 16 may be implemented in network 21. Specifically, RAN node 16 can be any kind of network node which may comprise of a radio network node such as base station, radio base station, base transceiver station, base station controller, network controller, evolved Node B (eNB), Node B, Multi-cell/multicast Coordination Entity (DICE), relay node, access point (AP), radio access point, Remote Radio Unit (RRU) Remote Radio Head (RRH), a core network node (e.g., Mobile Management Entity (MME), Self-Organizing Network (SON) node, a coordinating node, positioning node, MDT node, etc.), an edge router, or even an external node (e.g., 3rd party node, a node external to the current network), etc.

Wireless devices 17 are in communication with respective RAN nodes 16. It is understood that more or fewer than the wireless devices 17 depicted in FIG. 3 may be implemented in network 21. As used herein, wireless device 17 may be but is not limited to a user equipment (UE). Wireless device 17 is any type of device that is configured or configurable for communication through wireless communication. Examples of such wireless devices are sensors, modems, smart phones, machine type (MTC) devices a.k.a. machine to machine (M2M) devices, Personal Data Assistants (PDAs), iPADs, Tablets, smart phones, laptop embedded equipped (LEE), laptop mounted equipment (LME), Universal Serial Bus (USB) dongles, etc. Some of the wireless devices 17, e.g., wireless device 17h, are device-to-device (D2D) wireless devices and others, e.g., wireless device 17i, are non-D2D capable wireless devices. As used herein, "D2D wireless device" may include a D2D transmitting device and a D2D receiving device. Of course, the roles may reverse depending on which device is transmitting and which is receiving at any given time. A D2D transmitting device and a receiving device can be any types of wireless devices which are capable of communication at least through wireless communication. Examples include are sensors, modems, smart phones, machine type (MTC) devices a.k.a. machine to machine (M2M) devices, PDAs, iPADs, Tablets, laptop embedded equipped (LEE), laptop mounted equipment (LME), USB dongles, etc.

Further, while terminology from 3GPP LTE (or Evolved Universal Terrestrial Access Network (E-UTRAN)) is used in this disclosure to describe the embodiments, this should not be seen as limiting the scope of the disclosure to only the aforementioned system. Other wireless systems, including Wide Band Code Division Multiple Access (WCDMA), Universal Mobile Telecommunications System (UMTS) Evolved Terrestrial Radio Access (UTRA)-Frequency Division Duplexing (FDD), UTRA Time Division Duplexing (TDD), and Global System for Mobile Communications (GSM) Edge Radio Access Network (GERAN)/EDGE, may also benefit from exploiting the ideas covered within this disclosure.

As shown in FIG. 3, some wireless devices, e.g., base station wireless devices 23a and 23b (referred to collectively herein as "base station wireless device 23" or "BSWD 23") are selected to provide base station functions and are therefore transformed to a "base station wireless device" ("BSWD") that provides some functions of a cellular network BS that extend the coverage and quality of cellular services available for surrounding wireless devices 17. This advantageously provides an improvement of end-to-end services rather than restricting communications to local coverage only. The wireless devices that assume the responsibility of a BS by providing predetermined BS functions to other wireless devices 17 in communications network 21 are referred to herein either as "base station wireless devices 23" or "BSWDs 23." Base station wireless devices 23 include base station functionality code 32, which provides predetermined base station functions to the other (non-BSWD) wireless devices 17 in communications network 21. It should be noted that the BSWDs 23 need not include all of the functions of a traditional RAN node 16, i.e., base station. Rather, BSWDs 23 need only include those functions needed to provide the basic functionality in order to act as a serving base station to the other wireless devices 17 in communications network 21, e.g., scheduling, modulation and coding set assignment, etc. In one embodiment, RAN node 16 may include base station functionality code 32 and, in one embodiment, BSWD 23 may download (either fully or partly) base station functionality code 32 from RAN node 16. In this fashion, the base station functionality of BSWD 23 is not necessarily fixed but can be dynamic based on current needs and/or updated behavior.

As used herein, BSWD 23 may be but is not limited to a UE. BSWD 23 is any type of device that is configured or configurable for communication through wireless communication but with added base station functionality as discussed herein. Examples of such base station wireless devices 23 are sensors, modems, smart phones, machine type (MTC) devices a.k.a. machine to machine (M2M) devices, Personal Data Assistants (PDAs), iPADs, Tablets, smart phones, laptop embedded equipped (LEE), laptop mounted equipment (LME), Universal Serial Bus (USB) dongles, etc. BSWDs 23 may include D2D communication capability allowing BSWDs 23 to communicate directly with some or all of the other wireless devices 17 or other BSWDs 23, which have D2D communication capability.

As shown in FIG. 3, due to a failure of RAN nodes (i.e., base stations) 16g and 16j, base station wireless devices 23a and 23b start acting as a cellular (small range) base stations. In one embodiment, base station wireless devices 23a and 23b provide base station capabilities from the perspective of surrounding wireless devices 17. For example, surrounding wireless devices 17h and 17i perceive base station wireless device 23a that is transformed to a wireless device with base station capabilities (BSWD) as a regularly deployed small power base station, not only from the perspective of the radio interface, but also from the point of view of CN connectivity and end-to-services. Similarly, wireless devices 17n and 17o perceive base station wireless device 23b as a wireless device with base station capabilities (BSWD). In one embodiment, wireless device 17l is handed over to base station wireless device 23b (BSWD) even though wireless device 17l still may maintain connectivity through a serving RAN node (i.e., base station), 16j. Instead, the handover occurs because the connection (i.e., sidelink or connection under UL/DL protocol) between wireless device 17l and base station wireless device 23b (BSWD) provides a stronger connection. In another embodiment, base station wireless devices 23a and 23b provide base station capabilities from the perspective of ERs 22 of CN 14. In this scenario, the ER 22 can use one of its supported technologies (fixed or wireless) to connect to the transformed BSWD, e.g., base station wireless device 23a and/or base station wireless device 23. This is facilitated by the transformed wireless device (base station wireless device 23a and/or base station wireless device 23b) emulating the S1 interface towards the ER 22.

As illustrated in FIG. 3, the base station wireless device(s) (BSWD) that provides base station capabilities i.e., 23a and 23b, can provide cellular service to the surrounding wireless devices 17 in a number of ways. In one embodiment, base station wireless devices 23a and 23b emulate the uplink (UL) and downlink (DL) towards surrounding wireless devices 17 such that the UL and DL protocols towards the surrounding wireless devices 17 are maintained. In another embodiment, base station wireless devices 23a and 23b can provide cellular service to the surrounding wireless devices 17 using sidelink (SL) protocols towards the surrounding wireless devices 17 having D2D capability. In this embodiment, both the BSWDs 23 (23a and 23b) and the served wireless devices 17 may use the sidelink (or UL/DL) protocols to establish and maintain connectivity with those wireless devices having D2D capabilities, e.g., wireless device 17h, 17l, 17n and 17c. Similar to the first embodiment, base station wireless devices 23a and 23b use either wired or wireless connectivity towards ERs 22 according to the S1 interface. Note that after one or more base station wireless devices 23 take on the role of BSWDs and provide predetermined base station functions, the S1 interface may have to be reconfigured, as shown in FIG. 3. Of course, besides S1 interfaces, other interfaces may be employed.

Figure 4:
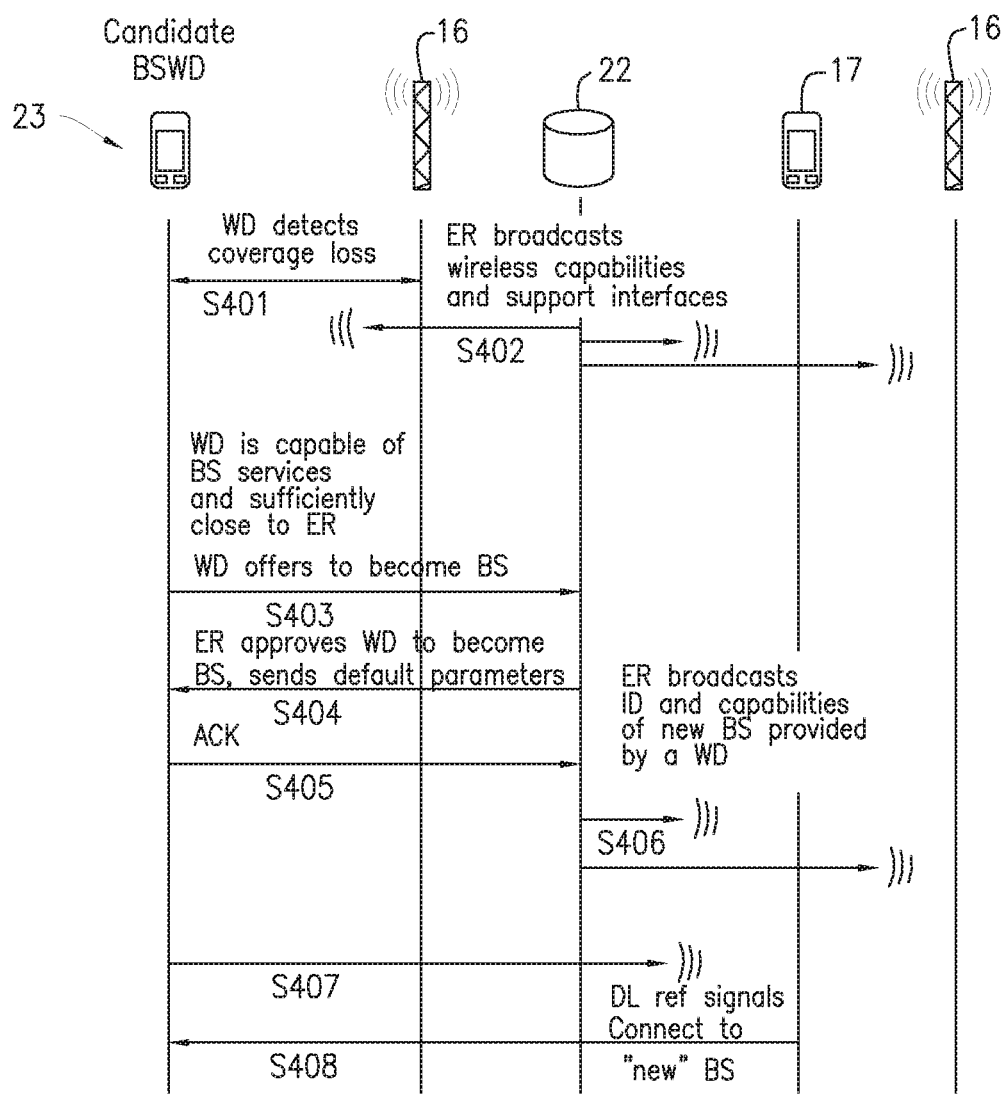
FIG. 4 is a timing diagram illustrating steps taken by the present disclosure when parts or all of the RAN become dysfunctional.

FIG. 4 is a timing diagram illustrating steps taken by the present disclosure to maintain end-to-end services when parts of RAN 12 or all of RAN 12 becomes dysfunctional. FIG. 4 illustrates example steps taken by a candidate base station wireless device 23 to determine a condition triggering a need to provide predetermined base station functions to other wireless devices 17 in communications network 21. The conditions triggering the need to provide the predetermined base station functions could be, for example, a detection of a loss of cellular coverage with a serving RAN node (e.g., base station) 16. Another condition that could trigger the need to provide predetermined base station functions to other wireless devices 17 is if a candidate base station wireless device 23 receives a signal from a network node, i.e., RAN node 16 or edge router 22, indicating that an S1 interface between the RAN node (e.g., base station) 16 serving the candidate base station wireless device 23 and a radio access network (RAN) has become impaired. Another condition that may trigger the need to provide predetermined base station functions to other wireless devices 17 may be that measurements taken by a candidate base station wireless device 23 indicate such a need. These measurements may include at least one of reference signal received power (RSRP) reference signal received quality (RSRQ) end-to-end bit rates, packet error probability, latency, etc. These measurements may exceed or fall short of a predefined threshold value, thus triggering a condition that indicates the need to provide predetermined base station functions to other wireless devices 17 in communications network 21.

Referring to FIG. 4, one or more wireless devices 17 that can serve as a wireless device configured to provide base station functions to neighboring wireless devices in network 21, i.e., a candidate BSWD 23, (i.e., a wireless device that includes the BSWD functionality), detects a loss of cellular coverage with base station 16. Some or all of the candidate BSWDs 23 that are served by RAN 12 may perform measurements in order to continuously sense the quality of the cellular coverage in terms of received reference signal received power (RSRP) or reference signal received quality (RSRQ) and/or measured end-to-end bitrates, packet error probability, latency or combinations of such measurements. In step S401, the candidate BSWD 23 detects a loss of cellular coverage with respect to RAN node 16. A loss of cellular coverage could occur, for example, when an RSRP measurement falls below a predetermined threshold value for a predefined duration of time or when a block error rate (BLER) exceeds a certain threshold value for a predefined duration of time. In case of loss or degradation of the cellular service capabilities detected by the candidate BSWD 23, the candidate BSWD 23 assesses the need for cellular coverage or service extension. Such assessment can be based on the loss of cellular reference signals or explicit signaling from the RAN 12 or CN ER 22. For example, the CN ER 22 may announce using a specific (SOS) signal that the S1 interface towards the RAN 12 has become dysfunctional. In another case, the base station can signal or broadcast the detection of loss of the S1 interface.

In step S402, ER 22 of backhaul network 18 broadcasts its capability information to other base stations 16 and wireless devices 17 in network 21. In some embodiments, the capability information contains details of the available wired (fixed) and wireless capabilities of the ER 22. Such broadcasted information can, contain information about, for example, the supported frequency bands, (e.g. 30 GHz, 60 GHz, etc.), supported interfaces (e.g. 3GPP S1 interface), wireless and IP related protocols (e.g. mobile IP), maximum number of simultaneously supported connected BSs (e.g., S1 capacity) and possibly other parameters related to quality of service (QoS), security and other aspects (e.g., processing capabilities).

If the candidate BSWD 23 becomes aware of the need for cellular service improvement or coverage extension (either by its own measurements and/or RAN 12/CN 14 signaling), the candidate BSWD 23 evaluates its own capabilities for improving the cellular service. High end handheld wireless devices 17 or provisionally deployed stationary wireless devices 17, for example, can, for example, be able to simultaneously maintaining a wireless S1 connection while emulating DL/UL, interfaces towards other wireless devices 17. If the candidate BSWD 23 determines that it is capable of providing base station services to other wireless devices 17 in network 21 and is within a predetermined distance of ER 22, at step S403, the candidate BSWD 23 signals its willingness and capabilities (e.g., maximum output power, number of antennas, supported frequency bands) to RAN node 16 (i.e., its serving base station) if RAN node 16 is available. Alternatively, such signaling can be sent to the wireless ER 22 based on the previously broadcasted ER capabilities. In yet another embodiment, the capability to act as a BSWD 23 may be communicated to network 21 as part of a regular capability transfer from BSWD 23, e.g., upon initial connection of BSWD 23 to network 21 before the corresponding capabilities of network 21 are known to BSWD 23.

Upon receiving such signaling from the candidate BSWD 23, ER 22 evaluates the candidate BSWD 23 that indicated their availability for cellular service improvement to ER 22. This evaluation may take into account the signaled wireless devices' capabilities or wireless device category as well as the received signal strength from the candidate BSWDs 23. The output of this evaluation is the set of BSWDs 23 that ER 22 and/or RAN 12 approves for cellular service enhancement.

If RAN node 16 is dysfunctional, ER 22, at step S404, signals to the candidate BSWD 23 indicating an approval of one or more of the candidate BSWDs 23 (i.e., "qualifying BSWD 23") to act in the capacity of a base station. Included in the signaling is a set of default configuration parameters that concern the operation of the qualifying BSWD 23. Such parameters may include the operational bandwidth and/or carrier frequencies for DL and UL operation, the new cell identity (Cell ID) that the qualifying BSWD 23 should use, a neighbor cell list, a maximum allowed transmit power, as well as parameters of the S1 interface. In one embodiment, in step S405, after receiving this set of configuration parameters, the qualifying BSWD 23 sends an acknowledgement (ACK) to ER 22.

When ER 22 receives the ACK from the qualifying BSWD, ER 22 broadcasts, at step S406, the presence of the newly approved BS (implemented by one or more qualifying BSWDs 23) to surrounding RAN nodes 16 and ERs 22. Note that the present disclosure enables the use of a fixed (wired) interface between the RAN 12 and the CN 14. This can be the case, if, for example, the qualifying BSWD 23 is inserted into a fixed mounted socket in a small office or home environment to serve as a temporary base station or wireless access point. When the qualifying BSWD 23 receives the approval and the configuration parameters from the RAN 12 (in the case when the RAN nodes 16 are available) or from the CN ER 22, the qualifying BSWD 23 starts acting as a base station according to the configured parameters by transmitting DL signals to neighboring wireless devices 17, at step S407. The neighboring wireless devices 17 then can detect the presence of, and connect to the "new" base station, i.e., the qualifying BSWD 23 at step S408.

Figure 5:
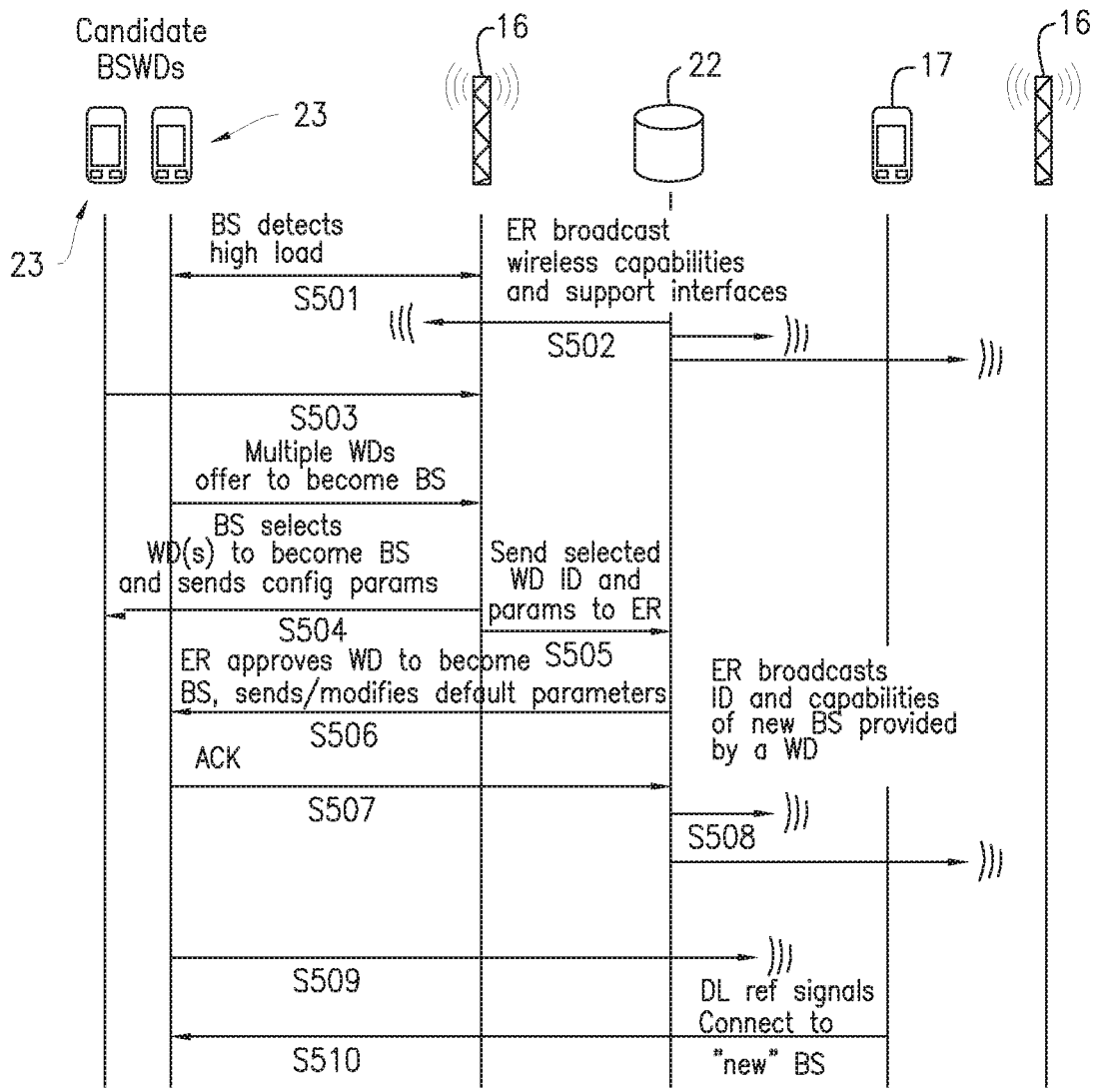
FIG. 5 is a timing diagram illustrating steps taken by the present disclosure to improve the capacity of the cellular network in the case of hotspot and temporary high traffic demand scenarios.

FIG. 5 is a timing diagram illustrating steps taken by the present disclosure to improve the capacity of the cellular network in the case of hotspot and temporary high traffic demand scenarios. Specifically, FIG. 5 illustrates a method for enabling a wireless device 17 to serve as a base station to at least one other wireless device 17 in communications network 21, where the wireless device that assumes predetermined base station functions is equipped and configured to perform these predetermined base station functions. According to FIG. 5, a method is shown that addresses temporary capacity problems detected by RAN 12. In this embodiment, RAN node detects an overload situation in terms of the number of wireless devices 17 requesting service in a given coverage area exceeding a predefined threshold or the aggregated service level of currently active or requested radio bearer services exceeding a predefined threshold and when such high load is detected, base station 16 signals a request to some specific candidate BSWDs 23, at step S501. In one embodiment, high network load may occur when several wireless devices 17 require a large number of physical layer resources, such as a large allocated bandwidth and/or a large number of repeated transmissions in order to obtain the desired service. This may occur, for example, when the wireless devices 17 are wireless sensors that have poor coverage with respect to RAN node(s) 16. A properly selected BSWD 23 may then provide better coverage to the other wireless devices 17 in network 21 and/or be used for providing the required number of physical resources, thus alleviating the load on RAN node(s) 16.

Thus, in one embodiment, RAN node 16 determines a condition triggering a need to provide predetermined base station functions to other wireless devices 17 in communications network 21. In other embodiments, one or more base station wireless devices 23 in communications network 21 determine the condition triggering the need to provide the predetermined base station functions to the other wireless devices 17. In another embodiment, RAN node 16 broadcasts a signal to the entire coverage area, the signal indicating that a high load has been detected. Similar to the scenario in FIG. 4, in step S502, ER 22 of backhaul network 18 broadcast its capability information to other RAN nodes 16 and wireless devices 17 in network 21.

When the candidate BSWDs 23 within the set of wireless devices 17 receives such signaling information from RAN node 16, each candidate BSWD 23 starts an evaluation process that determines whether or not they are configured to provide and are willing to extend the cellular service. Such evaluation process can take into account the capabilities of the candidate BSWDs 23 as well as incentive-based parameters broadcasted or signaled by the candidate BSWDs 23. Such incentives can indicate, for example, free-of-charge cellular services for the candidate BSWD 23, or improved QoS for services requested by the candidate BSWDs 23. The candidate BSWDs 23 may also take into account their respective battery status or battery charging capabilities when evaluating their capability in participating in cellular service provisioning. For instance, a candidate BSWD 23 can become a BSWD (when necessary) if the candidate BSWD 23 is connected to a charger, and hence the power consumption may be less of an issue. At step S503, one or more of the candidate BSWDs 23 offer to assume predetermined base station functions. At step S504, RAN node 16 signals the candidate BSWDs 23 and selects one or more of the candidate BSWDs 23 to assume the role of a base station. At step S505, RAN node 16 sends wireless device identification information and associated configuration parameters for the selected. BSWDs 23 to ER 22. At step S506, ER 22 signals to the candidate BSWDs 23 indicating an approval of one or more of the candidate BSWDs 23 (i.e., "qualifying BSWDs") to act in the capacity of a base station by providing predetermined base station functions.

Included in the signaling is a set of default configuration parameters that concern the operation of the qualifying BSWDs 23 as described above with respect to step S404 in FIG. 4. The set of default configuration parameters may include, but are not limited to, the following parameters:
  downlink channel bandwidth in term of resource blocks (RBs)
  carrier frequencies for DL and UL operation
  Physical hybrid automatic repeat request (ARQ) indication channel (PHICH) configuration (including MICH duration in time and PHICH resource in frequency domain)
  System Frame Number (SFN)
  Emulated public land mobile network (PLMN) identity
  Tracking area (TA) code
  Cell Id: it contains the emulated BS identity and may have a length of, for example, 28 bits
  Cell barred: whether a cell is barred or not (in one embodiment, default=not barred)
  Closed subscriber group (CSG) indication: to indicate whether this emulated cell is a CSG cell or not.
  q-RxLevMin: minimum required received power level in the emulated cell
  Band indicator: Cell frequency band indicator (frequency band identifier)

The above listing is part of the so-called master information block (MIB) and system information block (SIB) in LTE, for example. In one embodiment, these parameters are broadcasted or signaled by an LTE BS and therefore are also provided by the wireless device which is to become a BS (BSWD 23) as well. It should be noted that the configuration parameters listed above are merely exemplary and the present disclosure is not limited to only those configuration parameters listed above. Thus, the list above may include other system information (SI) parameters as well, i.e., such configuration parameters such as the ones contained in MIB/SIB known by one skilled in the art. These may include Physical (PHY), Media Access Control (MAC)/ Radio Link Control (RLC) and higher layer parameters, and parameters that include carrier frequency, i.e., where the frequency is parameterized as a channel number such as, for example, an Evolved Universal Mobile Telecommunications System (UMTS) Terrestrial Radio Access (E-UTRA) Absolute Radio Frequency Channel Number (EARFCN) number. The set of parameters may also include scheduling parameters in order to share common resources (such as time/frequency physical resources) between BSWD 23 and the rest of RAN 12. This may be used to keep interference levels in RAN 12 on acceptable levels.

In one embodiment, in step S507, after receiving this set of configuration parameters, the qualifying BSWD 23 (or BSWDs 23) sends an acknowledgement (ACK) to ER 22, where the acknowledgement provides a notification to ER 22 or any other network nodes in communications network 21 that the BSWD 23 is available to provide the predetermined base station functions. When ER 22 receives the ACK from the qualifying BSWD 23, it broadcasts, at step S508, the presence of the newly approved BS (implemented by the qualifying BSWD 23) to surrounding RAN nodes 16 and ERs 22. When the qualifying BSWD 23 receives the approval and the configuration parameters from the RAN 12 (in the case when the RAN nodes 16 are available) or from the CN ER 22, the qualifying BSWD 23 starts acting as a base station according to the configured parameters by transmitting DL signals to neighboring wireless devices 17, at step S509. The neighboring wireless devices 17 then connect to the "new" base station, i.e., the qualifying BSWD 23, at step S510.

Figure 6:
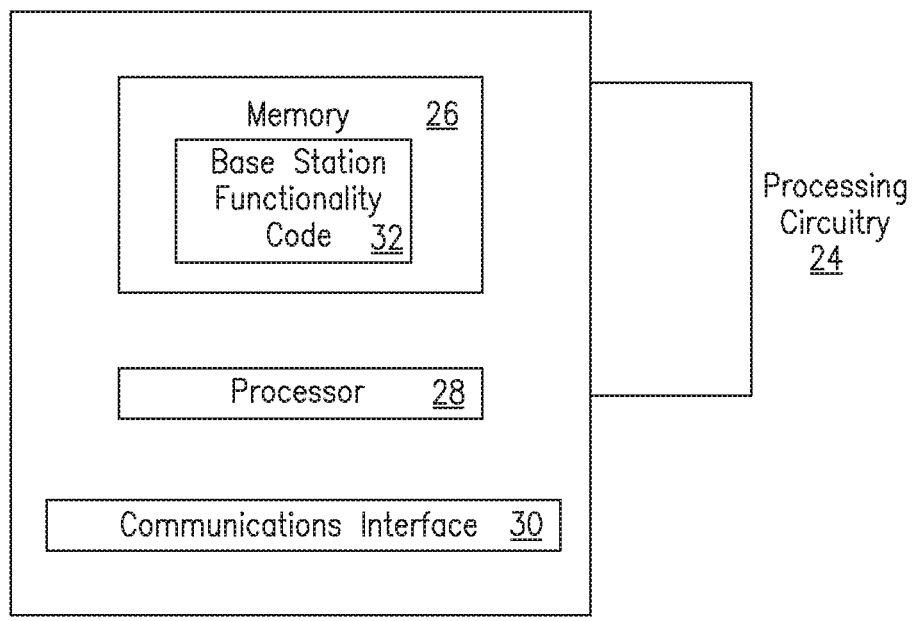
FIG. 6 is a block diagram of a wireless device configured to provide predetermined base station functions to at least one other wireless device in a communications network according to principles of the present disclosure.

FIG. 6 is a block diagram of a BSWD 23 configured to provide predetermined base station functions to at least one other wireless device 17 in communications network 21 according to the present disclosure. Specifically, BSWD 23 is configured to serve as a base station to at least one other wireless device 17 in communications network 21, where the BSWD 23 is configured to perform predetermined base station functions. BSWD 23 includes processing circuitry 24, which includes a memory 26 in communication with a processor 28. In addition to a traditional processor and memory, processing circuitry 24 may comprise integrated circuitry for processing and/or control, e.g., one or more processors and/or processor cores and/or FPGAs (Field Programmable Gate Array) and/or ASICs (Application Specific Integrated Circuitry). Processor 28 may be configured to access (e.g., write to and/or reading from) memory 26, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by processor 28 and/or other data, e.g., data pertaining to communication, e.g., configuration and/or address data of nodes, etc.

Memory 26 has instructions, including base station functionality code 32, that, when executed by processor 28, configure processor 28 to perform the functions described in this disclosure, including determining a condition triggering a need to provide the predetermined base station functions to the at least one other wireless device 17. Base station functionality code 32 may, in one embodiment, be (fully or partly) downloaded from a RAN node 16, i.e., the base station functionality of BSWD 23 is not necessarily fixed but can be dynamic based on current needs and/or updated behavior. BSWD 23 also includes communications interface 30, which is configured to notify a network node, such as edge router 22, in communications network 21 that BSWD 23 is available to provide the predetermined base station functions and also configured to receive approval from the network node 22 to provide the predetermined base station functions. Processor 28 is further configured to provide the predetermined base station functions to the at least one other wireless device 17 in communication network 21.

Figure 7:
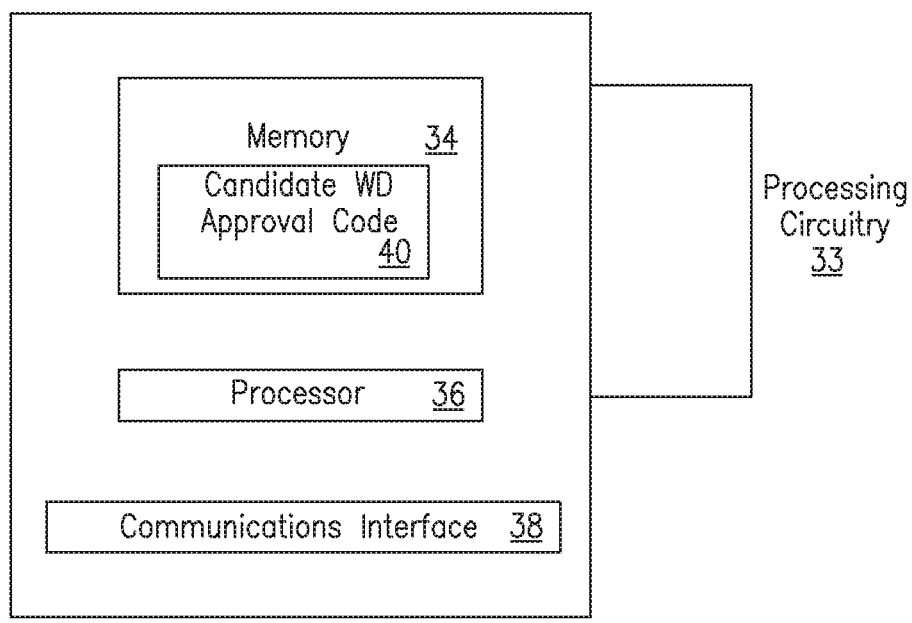
FIG. 7 is a block diagram of a network node configured to enable a wireless device to provide predetermined base station functions to at least one other wireless device in a communications network according to principles of the present disclosure.

FIG. 7 is a block diagram of a network node 25 which could be, for example, edge router 22 or a RAN node 16, such as, for example, a base station, configured to enable a wireless device 17 to provide predetermined base station functions to at least one other wireless device 17 in communications network 21 according to the present disclosure. Specifically, network node 25 is configured to enable a BWSD 23 of a plurality of BWSDs 23 to provide predetermined base station functions to at least one other wireless device 17 of the plurality of wireless devices 17 in communications network 21 the BWSD 23 being configured to perform the predetermined base station functions. Network node 25 includes processing circuitry 33, which includes a memory 34 in communication with a processor 36. In addition to a traditional processor and memory, processing circuitry 33 may comprise integrated circuitry for processing and/or control, e.g., one or more processors and/or processor cores and/or FPGAs (Field Programmable Gate Array) and/or ASICs (Application Specific Integrated Circuitry). Processor 36 may be configured to access (e.g., write to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by processor 36 and/or other data, e.g., data pertaining to communication, e.g., configuration and/or address data of nodes, etc.

Memory 34 has instructions, including candidate wireless device approval code 40, that, when executed by processor 36, configure processor 36 to perform the functions described in this disclosure, including evaluating at least one candidate BSWD 23, and based at least upon the evaluating of the at least one candidate BSWD 23, approving at least one of the at least one candidate BSWDs to provide the predetermined base station functions to the at least one other wireless device 1'7 in communications network 21. Network node 25 also includes a communications interface 38 configured to receive, from at least one candidate BSWD 23, a notification that the at least one candidate BSWD 23 is available to provide the predetermined base station functions.

Figure 8:
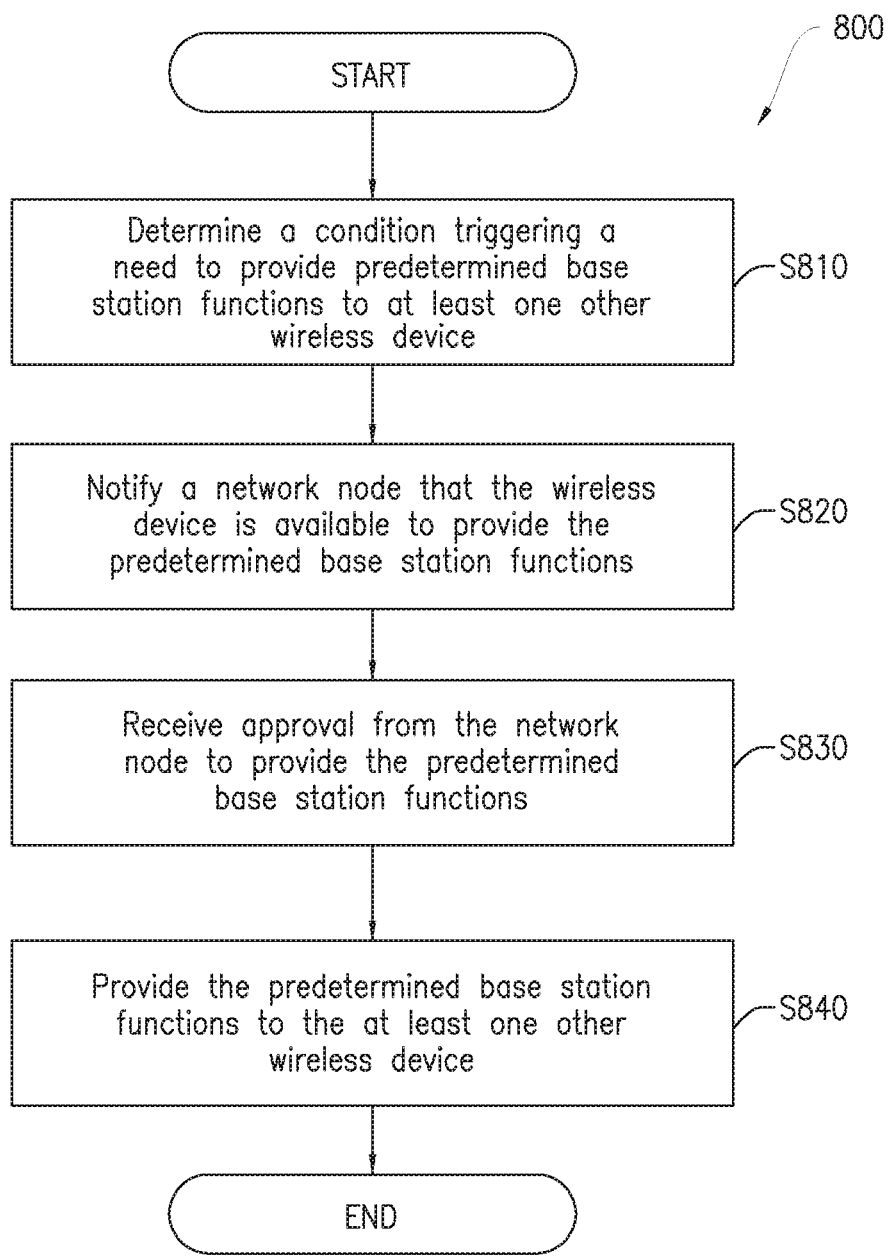
FIG. 8 is a flow diagram illustrating an exemplary process, performed by a wireless device, for enabling the wireless device to provide predetermined base station functions to at least one other wireless device in a communications network according to principles of the present disclosure.

FIG. 8 is a flow diagram illustrating an exemplary process, performed by a BSWD 23, for enabling the BSWD 23 to provide predetermined base station functions to at least one other wireless device 17 in communications network 21 according to the present disclosure. Specifically, the method 800 is a method for enabling a BSWD 23 to serve as a base station to at least one other wireless device 17 in communications network 21, the BSWD 23 being configured to perform predetermined base station functions. Method 800 includes determining, by processor 28 of BSWD 23, a condition triggering a need to provide the predetermined base station functions to the at least one other wireless device 17 in communications network 21 (Block S810), and notifying, by communications interface 30 of BSWD 23, a network node 25 in communications network 21 that the BSWD 23 is available to provide the predetermined base station functions (Block S820). Method 800 further includes, receiving, by communications interface 30, approval from the network node 25 to provide the predetermined base station functions (Block S830), and providing, by processor 28 in conjunction with base station functionality code 32, the predetermined base station functions to the at least one other wireless device 17 (Block S840).

In another embodiment, determining the condition triggering the need to provide the predetermined base station functions to the at least one other wireless device 17 includes performing measurements to determine a quality of cellular coverage. In another embodiment, these measurements include at least one of reference signal received power (RSRP), reference signal received quality (RSRQ), end-to-end bit rates, packet error probability, and latency.

In another embodiment, the predetermined base station functions performed by BSWD 23 include emulating a base station uplink (UL) and a base station downlink (DL) to support the at least one other wireless device 17 such that base station UL and base station DL protocols used with respect to the at least one other wireless device 17 are maintained. In another embodiment, the predetermined base station functions performed by BSWD 23 include establishing sidelinks to support the at least one other wireless device 17 using sidelink protocols to maintain connectivity. In another embodiment, the network node 25 is an edge router 22 and wherein providing the predetermined base station functions to the at least one other wireless device 17 in communication network 21 includes emulating an S1 interface with the edge router 22.

In another embodiment, receiving approval from the network node 25 to provide the predetermined base station functions further includes receiving, by communications interface 30, configuration parameters from the network node 25, the configuration parameters concerning operation of the BSWD 23 when it performs the predetermined base station functions. In another embodiment, the configuration parameters include at least one of a carrier frequency, an operational bandwidth for DL and UL operation, a new cell identity (Cell ID) for BSWD 23, a neighbor cell list, a maximum allowed transmit power, and S1 interface parameters. In another embodiment, determining the condition triggering the need to provide the predetermined base station functions to the at least one other wireless device 17 includes detecting a loss of cellular coverage between BSWD 23 and a RAN node 16 (i.e., base station) serving BSWD 23.

In another embodiment, determining the condition triggering the need to provide, predetermined base station functions to the at least one other wireless device 17 includes receiving a signal from the network node 25 indicating that an S1 interface between a RAN node 16 serving BSWD 23 and a radio access network (RAN) 12 has become impaired. In another embodiment, the method further includes sending, by communications interface 30, an acknowledgement to the network node 25, the acknowledgment indicating that BSWD 23 will provide the predetermined base station functions to the at least one other wireless device 17. In another embodiment, the network node 25 is a base station and wherein determining the condition triggering the need to provide the predetermined base station functions to the at least one other wireless device 17 is performed by the base station based upon detection of a predetermined load on the base station.

Figure 9:
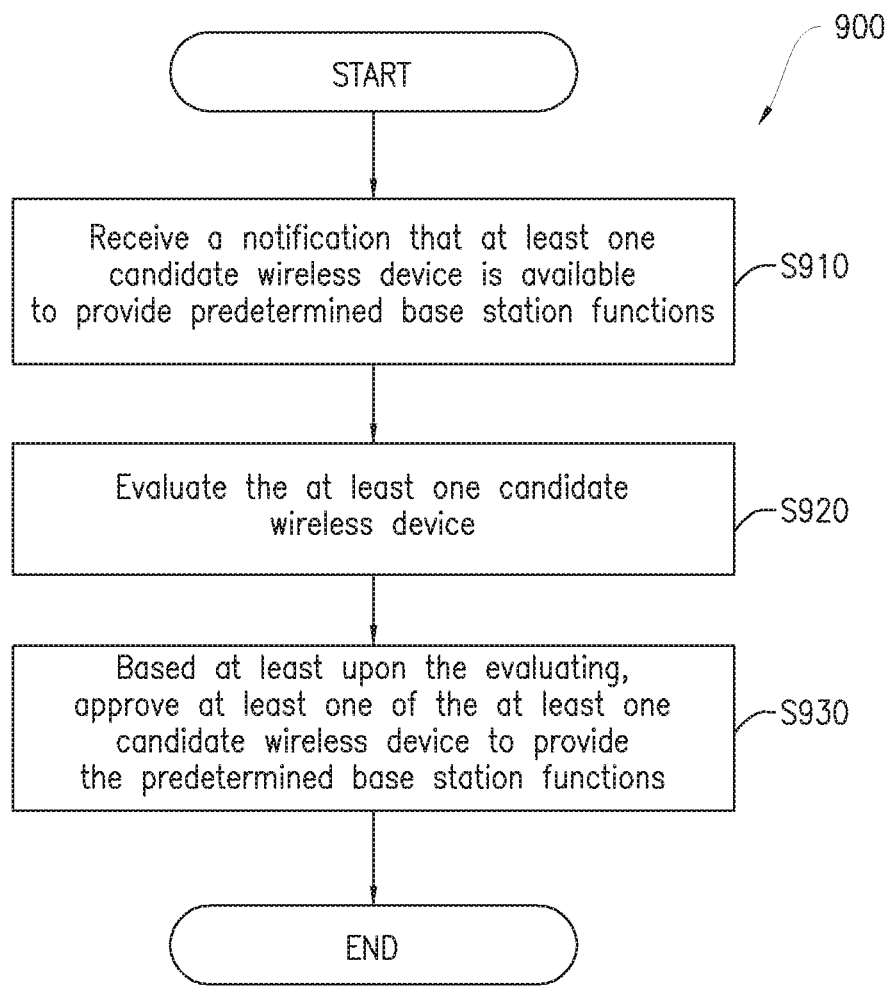
FIG. 9 is a flow diagram illustrating an exemplary process, performed by a network node, for enabling a wireless device to provide predetermined base station functions to at least one other wireless device in a communications network according to principles of the present disclosure.

FIG. 9 is a flow diagram illustrating an exemplary process, performed by a network node 25, for enabling BSWD 23 to provide predetermined base station functions to at least one other wireless device 17 in communications network 21 according to the present disclosure. Specifically, FIG. 9 illustrates a method 900 for enabling a wireless device 17 of a plurality of wireless devices 17 in communications network 21 to provide predetermined base station functions to at least one other wireless device 17 of the plurality of wireless devices 17, the wireless device 17 being configured to perform the predetermined base station functions. Method 900 includes receiving, by communications interface 38 of network node 25, from at least one candidate BSWD 23, a notification that the at least one candidate BSWD 23 is available to provide the predetermined base station functions (Block S910), and evaluating, by processor 36 of network node 25, the at least one candidate BSWD 23 (Block S920). Based at least upon on the evaluating of the at least one candidate BSWD 23, method 900 further includes approving, by processor 36 in conjunction with candidate wireless device approval code 40, at least one of the at least one candidate BSWD 23 to provide the predetermined base station functions to the at least one other wireless device 17 in communications network 21 (Block S930).

In another embodiment, the predetermined base station functions performed by the approved at least one of the at least one candidate BSWD 23 include emulating a base station uplink (UL) and a base station downlink (DL) to support the at least one other wireless device 17 such that base station UL and base station DL protocols used with respect to the at least one other wireless devices 17 are maintained. In another embodiment, the predetermined base station functions performed by the approved at least one of the at least one candidate BSWD 23 include establishing sidelinks to support the at least one other wireless device 17 using sidelink protocols to maintain connectivity. In another embodiment, providing the predetermined base station functions to the at least one other wireless device 17 in the communications network comprises emulating an S1 interface towards an edge router 22.

In another embodiment, evaluating the at least one candidate BSWD 23 includes considering at least one of signal strength and category of the at least one or more candidate BSWD 23. In another embodiment, the method further includes transmitting, by communications interface 38, to the approved at least one of the at least one candidate BSWD 23 configuration parameters concerning operation of the approved at least one of the at least one candidate BSWD 23 when it performs the predetermined base station functions. In another embodiment, the configuration parameters include at least one of a carrier frequency, an operational bandwidth for DL and UL, operation, a new cell identity (Cell ID) for the approved at least one of the at least one candidate BSWD 23, a neighbor cell list, a maximum allowed transmit power, and S1 interface parameters.

In another embodiment, the method further includes receiving, by communications interface 38, an acknowledgement from the approved at least one of the at least one candidate BSWD 23, the acknowledgment indicating that the approved at least one of the at least one candidate BSWD 23 will provide the predetermined base station functions to the at least one other wireless device 17. In another embodiment, upon receipt of the acknowledgement, communications interface 38 of network node 25 is further configured to broadcast a presence of the approved at least one of the at least one candidate BSWD 23 to other network nodes in the communication network 21. In another embodiment, the method further includes broadcasting, by communications interface 38 of network node 25, network node capability information to the plurality of wireless devices 17 in communication network 21. In another embodiment, the network node capability information includes at least one of supported frequency bands, supported interfaces, communication protocols, a maximum number of simultaneously supported network nodes, and quality of service (QoS) parameters. In another embodiment, the method further includes receiving, by communications interface 38 of network node 25, from a RAN node 16 such as a base station in communications network 21, identification parameters related to the approved at least one of the at least one candidate BSWD 23.

Figure 10:
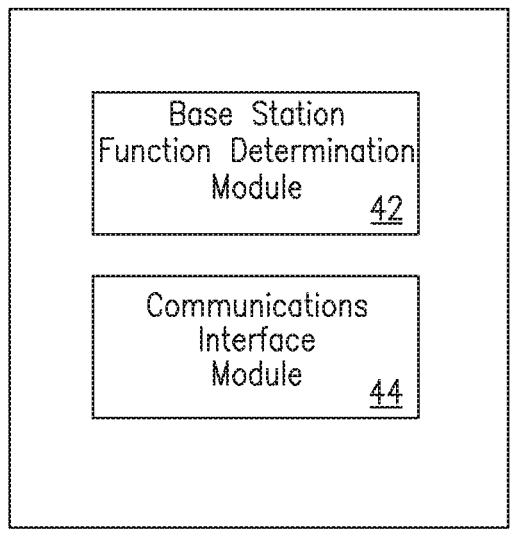
FIG. 10 is a block diagram of an alternate wireless device configured to provide predetermined base station functions to at least one other wireless device in a communications network according to principles of the present disclosure.

FIG. 10 is a block diagram of an alternate wireless device 40 configured to provide predetermined base station functions to at least one other wireless device 17 in communications network 21 according to the present disclosure. Specifically, FIG. 10 illustrates a wireless device 40 configured to serve as a base station to at least other wireless device 17 in communications network 21. The wireless device 40 is configured to perform predetermined base station functions. Wireless device 40 includes a base station function determination module 42 configured to determine a condition triggering a need to provide the predetermined base station functions to the at least one other wireless device 17, and a communications interface module 44 configured to notify a network node 25 in communications network 21 that wireless device 40 is available to provide the predetermined base station functions and receive approval from the network node 25 to provide the predetermined base station functions. Base station function determination module 42 is further configured to provide the predetermined base station functions to the at least one other wireless device 17 in communication network 21.

Figure 11:
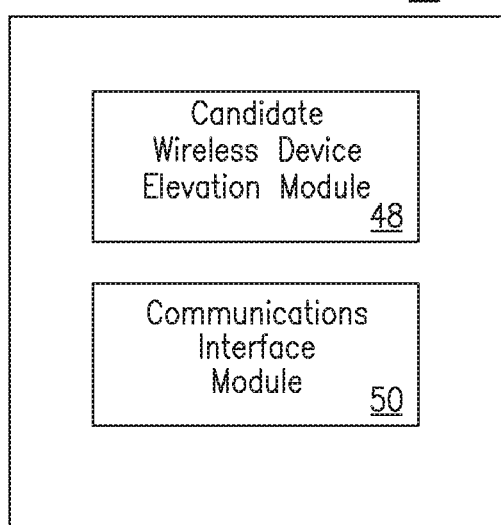
FIG. 11 is a block diagram of an alternate network node configured to enable a wireless device to provide predetermined base station functions to at least one other wireless device in a communications network according to principles of the present disclosure.

FIG. 11 is a block diagram of an alternate network node 46 configured to enable a BSWD 23 to provide predetermined base station functions to at least one other wireless device 17 in a communications network according to principles of the present disclosure. Specifically, network node 46 is configured for enabling BSWD 23 of a plurality of wireless devices 17 to provide predetermined base station functions to at least one other wireless device 17 of the plurality of wireless devices 17 in communications network 21, the BSWD 23 being configured to perform the predetermined base station functions. Network node 46 includes a candidate wireless device evaluation module 48 and a communications interface module 50. The candidate wireless device evaluation module 48 is configured to evaluate at least one candidate BSWD 23. The communications interface module 50 is configured to receive, from at least one candidate BSWD 23, a notification that the at least one candidate BSWD 23 is available to provide the predetermined base station functions. Based at least upon the evaluating of the at least one candidate BSWD 23, candidate wireless device evaluation module 48 is configured to approve at least one of the at least one candidate BSWD 23 to provide the predetermined base station functions to the at least one other wireless device 17 in communications network 21.

Although the disclosure describes implementing the process using a processor and a memory, embodiments are not limited to such. It is contemplated that embodiments performing the functions and calculations can be implemented using programmable gate arrays (PGAs), application specific integrated circuits (ASICs), and the like. Further, although embodiments are described using a network node such as base station or edge router, it is contemplated that the process steps can be performed in other network entities and even distributed across multiple network entities. Also, although the embodiments described above refer to a BSWD 23 providing base station functions to other wireless devices 17, it is understood that a BSWD 23 can provide base station functions to other BSWDs 23 that may not themselves be serving as base stations for other wireless devices 23.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for enabling a wireless device of a plurality of wireless devices in a communications network to provide predetermined base station functions to at least one other wireless device of the plurality of wireless devices, the wireless device being configured to perform the predetermined base station functions, the method comprising:

receiving, by a network node, from at least one candidate wireless device of the plurality of wireless devices, a notification that the at least one candidate wireless device is available to provide the predetermined base station functions;

evaluating the at least one candidate wireless device;
based at least upon the evaluating of the at least one candidate wireless device, approving at least one of the at least one candidate wireless device to provide the predetermined base station functions to the at least one other wireless device in the communications network;
receiving an acknowledgement from the at least one approved candidate wireless device, the acknowledgment indicating that the at least one approved candidate wireless device will provide the predetermined base station functions to the at least one other wireless device; and
upon receiving the acknowledgement, broadcasting a presence of the at least one approved candidate wireless device to other network nodes in the communications network.

2. The method of claim 1, wherein the predetermined base station functions performed by the at least one approved candidate wireless device include emulating a base station uplink (UL) and a base station downlinks (DL) to support the at least one other wireless device such that base station UL and base station DL protocols used with respect to the at least one other wireless device are maintained.

3. The method of claim 1, wherein the predetermined base station functions performed by the at least one approved candidate wireless device include establishing sidelinks to support the at least one other wireless device using sidelink protocols to maintain connectivity.

4. The method of claim 1, wherein the predetermined base station functions performed by the at least one approved candidate wireless device include emulating an S1 interface towards an edge router.

5. The method of claim 1, wherein evaluating the at least one candidate wireless device includes considering at least one of signal strength and category of the at least one candidate wireless device.

6. The method of claim 1, further comprising transmitting, to the at least one approved candidate wireless device, configuration parameters concerning operation of the at least one approved candidate wireless device when the at least one approved candidate wireless device performs the predetermined base station functions.

7. The method of claim 6, wherein the configuration parameters include at least one of a carrier frequency, an operational bandwidth for downlink (DL) and uplink (UL) operation, a new cell identity (Cell ID) for the at least one approved candidate wireless device, a neighbor cell list, a maximum allowed transmit power, and S1 interface parameters.

8. The method of claim 1, further comprising broadcasting network node capability information to the plurality of wireless devices in the communications network.

9. The method of claim 8, wherein the network node capability information includes at least one of supported frequency bands, supported interfaces, communication protocols, a maximum number of simultaneously supported network nodes, and quality of service (QoS) parameters.

10. The method of claim 1, further comprising receiving, from a base station in the communications network, identification parameters related to the at least one approved candidate wireless device.

11. A network node for enabling a wireless device of a plurality of wireless devices to provide predetermined base station functions to at least one other wireless device of the plurality of wireless devices in a communications network, the wireless device being configured to perform the predetermined base station functions, the network node comprising:
a communications interface configured to communicate with one or more wireless devices of the plurality of wireless devices; and
processing circuitry including a memory and a processor, the memory in communication with the processor, the processing circuitry in communication with the communications interface, and the memory having instructions that, when executed by the processor, configure the processor to:
receive from at least one candidate wireless device of the plurality of wireless devices, via the communications interface, a notification that the at least one candidate wireless device is available to provide the predetermined base station functions;
evaluate the at least one candidate wireless device;
based at least upon the evaluation of the at least one candidate wireless device, approve at least one of the at least one candidate wireless device to provide the predetermined base station functions to the at least one other wireless device in the communications network;
receive, via the communications interface, an acknowledgement from the at least one approved candidate wireless device, the acknowledgment indicating that the at least one approved candidate wireless device will provide the predetermined base station functions to the at least one other wireless device; and
upon receipt of the acknowledgement, use the communications interface to broadcast a presence of the at least one approved candidate wireless device to other network nodes in the communications network.

12. The network node of claim 11, wherein the predetermined base station functions performed by the at least one approved candidate wireless device include emulating a base station uplink (UL) and a base station downlink (DL) to support the at least one other wireless device such that base station UL and base station DL protocols used with respect to the at least one other wireless device are maintained.

13. The network node of claim 11, wherein the predetermined base station functions performed by the at least one approved candidate wireless device include establishing sidelinks to support the at least one other wireless device using sidelink protocols to maintain connectivity.

14. The network node of claim 11, wherein the predetermined base station functions performed by the at least one approved candidate wireless device include emulating an S1 interface towards an edge router.

15. The network node of claim 11, wherein to evaluate the at least one candidate wireless device, the processor is configured to consider at least one of signal strength and category of the at least one candidate wireless device.

16. The network node of claim 11, wherein the processor is further configured to use the communications interface to transmit, to the at least one approved candidate wireless device, configuration parameters concerning operation of the at least one approved candidate wireless device when the at least one approved candidate wireless device performs the predetermined base station functions.

17. The network node of claim 16, wherein the configuration parameters include at least one of a carrier frequency, an operational bandwidth for downlink (DL) and uplink (UL) operation, a new cell identity (Cell ID) for the at least one approved candidate wireless device, a neighbor cell list, a maximum allowed transmit power, and S1 interface parameters.

18. The network node of claim 11, wherein the processor is further configured to broadcast, via the communications interface, network node capability information to the plurality of wireless devices in the communications network.

19. The network node of claim 18, wherein the network node capability information includes at least one of supported frequency bands, supported interfaces, communication protocols, a maximum number of simultaneously supported network nodes, and quality of service (QoS) parameters.

20. The network node of claim 11, wherein the processor is further configured to receive, from a base station in the communications network, identification parameters related to the at least one approved candidate wireless device.

* * * * *